United States Patent
Zelinski

[15] 3,685,761
[45] Aug. 22, 1972

[54] FIXTURE FOR WINDING FISHING LINE ONTO A FISHING POLE REEL

[72] Inventor: Raymond J. Zelinski, 6236 W. 130th St., Cleveland, Ohio 44130

[22] Filed: Nov. 9, 1970

[21] Appl. No.: 87,821

[52] U.S. Cl............242/84.1 R, 242/84.5 R, 242/106
[51] Int. Cl.................................................A01k 89/00
[58] Field of Search....242/84.1 R, 84.1 M, 106, 104, 242/99, 129.8, 129.7, 128, 84.5 R, 84.5 A, 84.51 R, 84.51 A

[56] References Cited

UNITED STATES PATENTS

| | | | |
|---|---|---|---|
| 3,026,059 | 3/1962 | Dennler | 242/84.5 R |
| 2,492,515 | 12/1949 | Beard | 242/106 X |
| 2,904,281 | 9/1959 | Jackson | 242/84.5 A |
| 2,848,778 | 8/1958 | Plummer, Sr. et al | 242/84.1 R |

Primary Examiner—Billy S. Taylor
Attorney—Baldwin, Egan, Walling & Fetzer

[57] ABSTRACT

A fixture for transfer of fishing line from a packaged supply spool to the usual reel attached to a fishing pole, and in a manner preventing kinks or entanglements in the line. The fixture provides a novel arrangement including an extensible support shaft means for providing for the mounting of either a single supply spool or a plurality of supply spools of fishing line on the fixture, and with the extensible portion of the spool support shaft means being adapted to be stored in coupled relation to the fixture body when the shaft extensible portion is not being utilized as a spool support. Adjustable braking means is provided for applying a frictional drag to the supply spool during the transferring process of winding the fishing line from the spool onto the fishing rod reel.

9 Claims, 4 Drawing Figures

PATENTED AUG 22 1972 3,685,761

INVENTOR.
RAYMOND J. ZELINSKI
BY
Baldwin, Egan, Walling & Fetzer
ATTORNEYS

FIXTURE FOR WINDING FISHING LINE ONTO A FISHING POLE REEL

This invention relates in general to fishing tackle mechanism and more particularly to a fixture usable in effectively transferring fishing line from a package supply spool of the line to the usual reel of a fishing rod.

BACKGROUND OF THE INVENTION

In transferring fishing line from a storage or commercial package supply spool, it is desirable that the fishing line be drawn from such spool generally tangentially so that the transference to the reel attached to a fishing pole may be effected without the introduction of kinks or entanglements to the line. Moreover, it may be desirable to be able to transfer the line from different sizes of supply spools, or being able to conveniently transfer the line from a plurality of supply spools to the reel of the fishing rod. Prior art arrangements for transfer of fishing line from a supply spool to the pole reel have not been generally satisfactory, and have not been usable with different sizes or numbers of spools. U. S. Pat. No. 2,993,661 issued July 25, 1961 to J. D'Arrigo is an example of a prior art arrangement for accomplishing transfer of line from a supply spool to a reel on a pole.

SUMMARY OF THE INVENTION

The present invention provides a fixture which is expeditiously operable to transfer fishing line from a commercial package spool of the line, to the reel of a fishing rod, and which may be used with different sizes of supply spools, or may be utilized with more than one supply spool for mounting thereon, and wherein means is provided for selectively resisting rotation of the spool or spools during the transfer operation.

Accordingly, an object of the invention is to provide a novel fixture for expeditious transfer of fishing line from a commercial supply spool of the line to the reel of a fishing pole.

Another object of the invention is to provide a fixture of the above identified type wherein different size spools (e.g. different widths of spool) or a plurality of spools, can be handled by the fixture.

A still further object of the invention is to provide a fixture of the latter mentioned type wherein the fixture includes a support shaft for the supply spool which is extensible by the addition of another shaft section to the initial section, and wherein the shaft sections have means for readily coupling the same together and uncoupling the same from one another, and wherein the fixture also includes means for storing the extensible shaft section when it is not needed for supporting a predetermined width of spool, or a plurality of spools, on the fixture, and in a manner facilitating its subsequent use.

A still further object of the invention is to provide an arrangement of the above type which provides for secure attachment of the fixture to the rod, and which includes means for restricting the rotational movement of a package supply spool of fishing line when the latter is mounted on the fixture.

A still further object of the invention is to provide a fixture of the above type which is pleasing in appearance and easy to manufacture, and which is expeditiously operable to accomplish transfer of fishing line from a package supply spool or spools of the fishing line, to the reel of the fishing rod.

Other objects and advantages of the invention will be apparent from the following description taken in conjunction with the accompanying drawings wherein:

DESCRIPTION OF PREFERRED EMBODIMENTS

Figure 1:
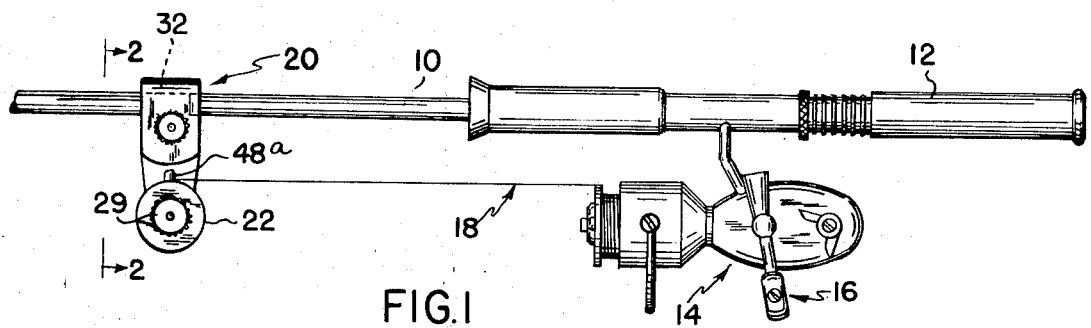
FIG. 1 is a fragmentary, elevational view of a fishing pole having a reel mounted thereon and with the fixture of the invention mounted on the pole in spaced relation to the reel and coacting with the latter to transfer fishing line from a commercial supply spool of the fishing line rotatably mounted on the fixture to the pole reel.
Figure 2:
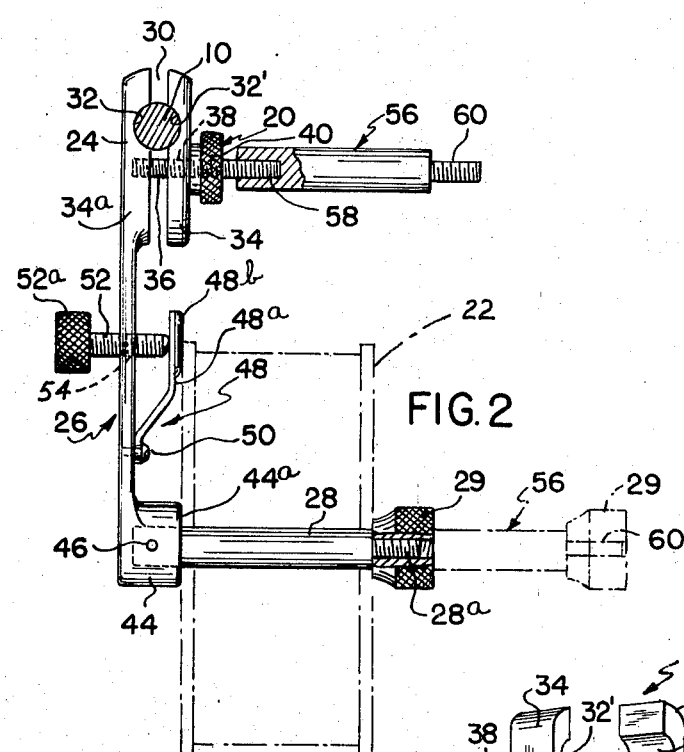
FIG. 2 is an enlarged front elevational partially sectioned view of the fixture taken generally along the plane of line 2-2 of FIG. 1 looking in the direction of the arrows, and illustrating in phantom a supply spool of fishing line mounted on the spool support shaft; in phantom lines there is shown the support shaft extended outwardly by an auxiliary shaft section so as to enable mounting thereon of a larger size spool, or a plurality of spools, for transfer of the line to the pole reel; in full lines there is shown the aforementioned auxiliary shaft extension mounted or stored on the fixture in non-interfering relation with the supply spool, and in a manner facilitating its use to extend the spool support shaft.
Figure 3:
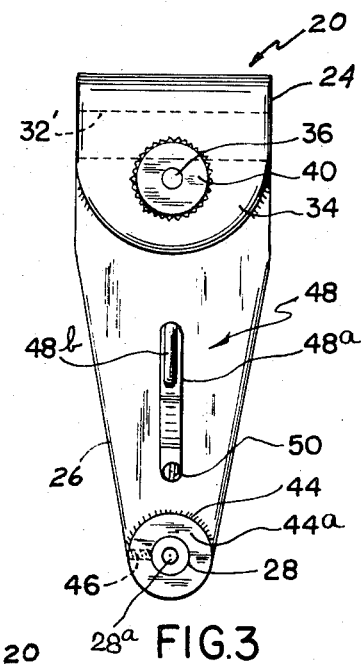
FIG. 3 is a side elevational view of the fixture.
Figure 4:
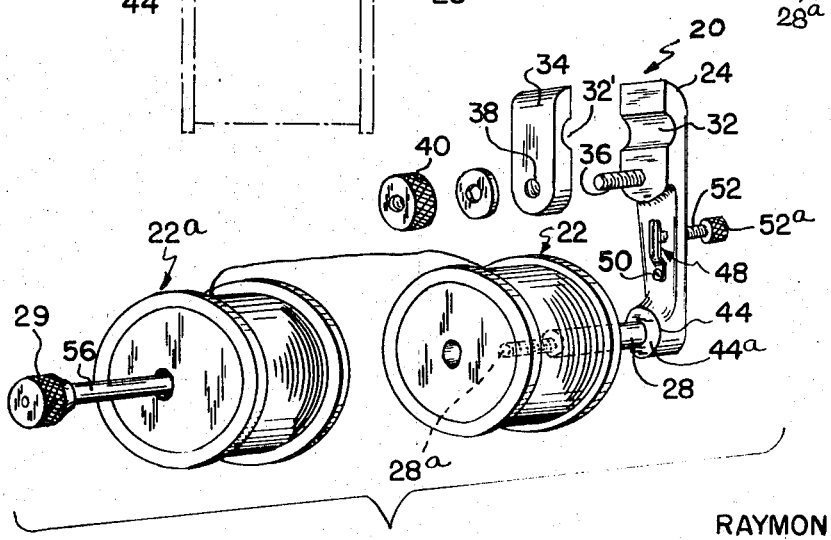
FIG. 4 is an exploded view of the fixture, and illustrating a plurality of supply spools of fishing line associated therewith, as provided for by extending the spool support shaft with the auxiliary shaft extension.

Referring now to FIG. 1, there is shown a fishing pole 10 having handle portion 12 and with a reel 14 attached thereto. Reel 14 includes a handle portion 16 for winding the fishing line 18 onto the reel 14.

In accordance with the present invention, a fixture 20 is provided for transferring fishing line as provided on a commercial supply spool (e.g. 22), from the spool to the reel 14, and without the introduction of kinks or entanglements in the line. Fixture 20 comprises a head portion 24 and a body portion 26 depending from the head portion 24, with the body portion 26 having a transversely or laterally extending shaft 28 with a threaded stub 28a on the end thereof, and with a threaded knob or abutment member 29 threadedly mounted on stub 28a. Member 29 is adapted to coact with the end of the shaft and the confronting surface of the spool of fishing line for retaining the spool in mounted relation on the support shaft 28. Head portion 24 has a longitudinal groove 32 formed in the inner side surface thereof, and which is adapted to receive the pole 10 for clamping of the latter by the movable gripping shoe section 34. As can be seen, a threaded stud 36 is anchored to the head portion 24 and freely extends through an opening 38 in the gripping shoe portion 34. A ferrule member 40 is threaded on stud 36 for coaction with gripping shoe 34 to urge the latter into tight clamping relationship with the pole. Shoe 34 also preferably has a longitudinal slot 32' formed therein complementary to slot 32, for receiving the pole 10 therein.

The lower end of the body portion 26 is preferably provided with an embossment 44 adjacent its lower end. Embossment 44 comprises a flat side 44a, which is adapted to guide the rotary movement of the adjacent supply spool 22 on support rod 28. As can be seen, rod 28 can be fixed to the body portion 26 by means of a threaded fastener 46, extending through an opening in the embossment 44 and engaging the shaft 28, the latter being received in a recess in embossment 44.

A frictional braking mechanism 48 is mounted in the embodiment illustrated on the body portion 26 and comprises a flexible tongue 48a secured as at 50 to the body portion and which extends laterally outwardly and is adapted to frictionally engage the inner side of the supply spool 22, to restrict rotary movement of the spool on the support shaft 28. A threaded stud 52 having a knurled handle portion 52a is threaded through a complementary threaded opening 54 in the body portion 26, and is adapted to engage the flexible tongue 48a and to selectively vary the frictional braking of the tongue against the side of the supply spool. It will be seen that completely releasing the stud 52 from engagement with the tongue 48a substantially reduces the friction of the tongue against the spool, while tightening the threaded stud 52 materially increases the frictional coaction of the tongue 48a with the side of the spool, and therefore materially increases the resistance to rotation of the spool 22. It will be apparent that the braking mechanism 48 is out of interfering relationship with the fishing pole 10 and can be readily operated while holding the fishing pole. In the embodiment illustrated, the flexible tongue 48a is formed of a piece of sheet metal having spring-like characteristics, and has an embossment 48b formed thereon for increasing the application of frictional force to the supply spool.

In certain instances it may be desirable to transfer fishing line from more than one spool of line to the reel 14. Accordingly, there is provided an auxiliary shaft extension portion 56 which may be of approximately the same bearing length as the length of the main support shaft 28. Aforementioned threaded stub 28a is adapted to be received into complementary threaded recess 58 formed in one end of the auxiliary shaft section 56 for mounting the latter on shaft 28. The depth of threaded recess 58 in the end of the auxiliary shaft 56 is such that the bottom or innermost surface of the recess 58 at least just slightly clears the outer end of stub 28a, and, therefore, shaft section 56 will abut against the outer or distal end of support 28, to form a substantially continuous shaft for the mounting of an enlarged spool of fishing line or a plurality of spools of fishing line on the fixture 20. Auxiliary shaft section 56 likewise has a threaded stub 60 on its outer end, adapted for threaded coaction with the aforementioned knurled nut 29, when the support shaft is extended, for retaining the spool or spools of fishing line on the coacting support shaft portions 28 and 56.

The extension of threaded stud 36 outwardly of the knurled nut 40 when the fixture is in clamped relation on the fishing pole 10 is such that the outer end of the threaded stud 36 engages the bottom or innermost surface of the recess 58 in extension shaft section 56 in the stored condition thereof, so as to prevent the extension shaft section from engaging the nut 40. Therefore, when it is desired to disassemble the shaft section 56 from its storage position on the fixture, it can be readily threaded off of stud 36 and threaded onto stub 28a on shaft 28 to extend the latter laterally outwardly. Moreover, it will be seen that the knurled nut 40 can be adjusted and tightened and/or loosened without interference with or by the auxiliary extension shaft 56, when the latter is in its stored position, or in other words, in coacting relationship with the stud 36 on the upper end of the fixture.

Transfer of the fishing line from the commercial supply spool or spools 22, 22a occurs rapidly when the line is coupled to the reel 14, and this transference occurs without kinking or entanglement of the fishing line.

The fixture may be formed of lightweight materials and is readily assembled on a fishing pole and can be left on the pole until such time as it is desired to add to or to substitute the fishing line existing on the pole for a new fishing line. Adjustment of the fixture 20 lengthwise of the fishing pole can be readily accomplished by loosening of the knurled nut 40 to permit longitudinal movement of the fixture lengthwise of the pole.

From the foregoing description and accompanying drawings, it will be seen that the invention provides a novel fixture for transferring of fishing line from a packaged supply spool or spools to the reel attached to the fishing pole, and in a manner preventing kinks or entanglements in the line. The arrangement is such that the fixture can handle either a single supply spool of fishing line, or a double spool of fishing line, or spools of various widths, and support shaft means is mounted in stored position on the fixture and is readily available for extending the primary support shaft of the fixture in the event that it is desirable or necessary to support a plurality of supply spools or a spool of different or greater width on the fixture. Adjustable braking means is provided for applying a frictional drag to the spool or spools during the transferring process of winding fishing line onto the fishing rod reel.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. A fixture for mounting on a fishing pole for transferring fishing line on a supply spool to the reel of the pole, and in a manner without inducing kinks and entanglements therein, said fixture comprising a head portion and a body portion projecting laterally of said head portion, means on said head portion for clamping said fixture to the pole in spaced relation to the reel thereof, support means secured to said body portion and projecting laterally thereof for rotatably mounting a spool of fishing line thereon, means coacting with the last mentioned support means for maintaining the spool of fishing line on said support means, said support means comprising shaft means on which the spool of fishing line is adapted for rotatable mounting, and other shaft means for extending the length of the first mentioned shaft means, whereby various widths of spools of fishing line or a plurality of spools of fishing line can be selectively mounted on said fixture, and means for removably storing said extending shaft means on said fixture in spaced relation to said first mentioned shaft means.

2. A fixture in accordance with claim 1 wherein said clamping means comprises an inner side clamping surface on said head portion and a relatively movable shoe disposed in confronting relation to said surface, and means extending between said surface and said shoe and supporting the latter for movement toward and away from said surface, the last mentioned means having means movably mounted thereon and coacting therewith for selectively urging said shoe in a direction toward said surface for clamping the pole between said surface and said shoe.

3. A fixture in accordance with claim 1 including braking means mounted on one or said portions and adapted for actuation for selectively restricting a rotary movement of a mounted spool of fishing line.

4. A fixture in accordance with claim 3 wherein said braking means comprises a flexible tongue anchored at one end thereof to said body portion, and movable stud means mounted on said body portion and coacting with said tongue for urging said tongue laterally of said body portion and into engagement with a side of an adjacent spool of fishing line.

5. A fixture in accordance with claim 4 wherein said stud means comprises a threaded member engaging in threaded coaction through an opening in said body portion and having a handle portion thereon for manual gripping for threadedly moving the threaded member relative to said body portion and into and from abutting engagement with said tongue.

6. A fixture in accordance with claim 2 wherein said surface and said shoe each have a slot therein running longitudinally thereof, said slots being disposed in confronting relation for receiving a fishing pole therein, said last mentioned means comprising a threaded shank extending from said head portion laterally thereof and extending through an opening in said shoe for mounting said shoe on said head portion, and said movably mounted means comprising a threaded nut coacting with said threaded shank and adapted for abutting relationship with said shoe for urging said shoe into tight gripping coaction with the fishing line pole.

7. A fixture in accordance with claim 1 wherein the storing means is on said head portion.

8. A fixture in accordance with claim 7 wherein said extending shaft means has a threaded recess in one end thereof and wherein said first mentioned shaft means comprises a threaded stub on the distal end thereof adapted to be threadedly received in said recess for connecting said extending shaft means to said first mentioned shaft means and thereby extending the latter laterally further from said body portion, said storing means on said head portion comprising a threaded stud projecting laterally of said head portion and formed complementary to said recess for being threadedly received therein in supporting relation in the stored condition of said extending shaft means, said clamping means on said head portion including a threaded nut threadedly mounted on said stud, the projection of said stud laterally of said nut in the clamping condition of the latter being such that the distal end of said stud coacts with said recess to prevent engagement of said extending shaft means with said nut, to thus provide for ready disengagement of said extending shaft means from said stud without disturbing the clamping position and clamping effect of said nut on said stud.

9. A fixture in accordance with claim 8 wherein said extending shaft means includes a threaded stub on the end thereof opposite to said recess, the last mentioned stub being adapted to receive thereon in removable threaded relation said means for maintaining the spool or spools of fishing line on said support means in the extended condition of the latter.

* * * * *